(12) United States Patent
Jang et al.

(10) Patent No.: US 11,695,291 B2
(45) Date of Patent: Jul. 4, 2023

(54) METHOD TO CHARGE BATTERY AND ELECTRONIC DEVICE INCLUDING BATTERY

(71) Applicant: Samsung Electronics Co., Ltd., Gyeonggi-do (KR)

(72) Inventors: Kiyoun Jang, Gyeonggi-do (KR); Myeongho Kim, Gyeonggi-do (KR); Shihyun Kim, Gyeonggi-do (KR); Inhye Kim, Gyeonggi-do (KR); Chaisung Ryu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 17/016,565

(22) Filed: Sep. 10, 2020

(65) Prior Publication Data

US 2021/0091586 A1 Mar. 25, 2021

(30) Foreign Application Priority Data

Sep. 20, 2019 (KR) ........................ 10-2019-0116401

(51) Int. Cl.
*H02J 7/00* (2006.01)
*G06F 1/28* (2006.01)
(Continued)

(52) U.S. Cl.
CPC ............ *H02J 7/0071* (2020.01); *G06F 1/163* (2013.01); *G06F 1/28* (2013.01); *G06F 1/3212* (2013.01);
(Continued)

(58) Field of Classification Search
CPC ............................. H02J 7/0071; H02J 7/0032
See application file for complete search history.

(56) References Cited

U.S. PATENT DOCUMENTS

| 8,805,456 B1 | 8/2014 | Hardy et al. |
| 8,922,329 B2 | 12/2014 | Davis et al. |

(Continued)

FOREIGN PATENT DOCUMENTS

| JP | 2012-100528 A | 5/2012 |
| KR | 97-0011060 B1 | 7/1997 |

(Continued)

OTHER PUBLICATIONS

International Search Report dated Dec. 24, 2020.

*Primary Examiner* — Robert Grant
(74) *Attorney, Agent, or Firm* — Cha & Reiter, LLC

(57) ABSTRACT

Disclosed is an electronic device. The electronic device includes a battery, a charging part configured to be connectable to an external charging device to charge the battery, a memory, and a processor operatively connected to the charging part and the memory. The processor may determine whether the charging part is connected to the external charging device, determine whether the electronic device moves and/or electronic device usage time information of a user, and reduce a voltage at which the battery enters supplementary charging to a second voltage lower than a first voltage which corresponds to a value stored in the memory, based on whether the electronic device moves and/or the electronic device usage time information. In addition, it is possible to implement various other embodiments understood through the disclosure.

20 Claims, 7 Drawing Sheets

(51) Int. Cl.
*G06F 1/3296* (2019.01)
*G06F 1/16* (2006.01)
*G06F 1/3212* (2019.01)

(52) U.S. Cl.
CPC .......... *G06F 1/3296* (2013.01); *H02J 7/0029* (2013.01); *H02J 7/00032* (2020.01); *H02J 7/0047* (2013.01)

(56) References Cited

U.S. PATENT DOCUMENTS

| | | | |
|---|---|---|---|
| 9,197,073 | B2 | 11/2015 | Yebka et al. |
| 10,468,905 | B2 | 11/2019 | Kim et al. |
| 10,797,509 | B2 | 10/2020 | Kim et al. |
| 2001/0001533 | A1* | 5/2001 | Stuck Andersen ... H02J 7/0071 320/150 |
| 2018/0062422 | A1 | 3/2018 | Kim et al. |
| 2020/0067342 | A1 | 2/2020 | Kim et al. |

FOREIGN PATENT DOCUMENTS

| | | |
|---|---|---|
| KR | 10-2015-0029453 A | 3/2015 |
| KR | 10-2016-0070524 A | 6/2016 |

* cited by examiner

METHOD TO CHARGE BATTERY AND ELECTRONIC DEVICE INCLUDING BATTERY

CROSS-REFERENCE TO RELATED APPLICATION(S)

This application is based on and claims priority under 35 U.S.C. § 119 to Korean Patent Application No. 10-2019-0116401, filed on Sep. 20, 2019, in the Korean Intellectual Property Office, the disclosure of which is incorporated by reference herein its entirety.

BACKGROUND

1. Field

One or more embodiments disclosed herein generally relate to technology for implementing a method to charge a battery and an electronic device including the battery.

2. Description of Related Art

An electronic device operates for a certain period of time by using a battery when it is separated from an external power source. As the battery is discharged, power required for the operation of an electronic device is supplied to circuits and/or modules inside the electronic device. When the electronic device is connected to an external power source or charging device, the battery is charged. A portable electronic device such as a smart phone, a wearable electronic device such as a smart watch, and an Internet of things (IoT) electronic device such as an AI speaker or an IP camera may be equipped with a secondary rechargeable battery.

The battery of the electronic device has a specified life span such as a specified period of time or a specified number of use cycles. As the battery is used, deterioration occurs in the battery and performance decreases. When the performance of the battery decreases, the capacity of the battery may decrease. In addition, when the performance of the battery decreases, the battery may start to swell and its outer shape may start to deform. This is referred to as a swelling phenomenon.

The above information is presented as background information only to assist with an understanding of the disclosure. No determination has been made, and no assertion is made, as to whether any of the above might be applicable as prior art with regard to the disclosure.

SUMMARY

When the battery of an electronic device is charged, the electronic device may be connected to a charging device for a long time, e.g. hours or days. For example, after connecting the electronic device to the charging device, the user may be absent or sleep, in which case he or she will not be using the electronic device. When the electronic device is connected to the charging device for a long time, the charging circuit of the electronic device may continuously perform supplementary charging to maintain the fully charged state of the battery. That is, the supplementary charging may compensate for the nominal discharge of the battery after it is fully charged during standby of the electronic device. When the voltage of the battery decreases below a specified voltage level, a processor of the electronic device may control the charging circuit to perform the supplementary charging of the battery. Deterioration of the battery may occur when the battery is continuously charged by supplementary charging while the battery is connected to the charging device.

In particular, in the case of a wearable electronic device, which has a relatively small battery as compared to other electronic devices, the battery may continuously perform supplementary charging while being connected to a charging device. The battery of the wearable electronic device may consume power in the form of a standby current used in the standby state of the wearable electronic device and naturally discharge while the wearable device is connected to a charging device. The charging circuit of the wearable electronic device may perform supplementary charging when the voltage of the battery decreases below a specified voltage level. Because the capacity of the battery of the wearable electronic device is small, the rate of natural discharge may be greater than that of other electronic devices. When the rate of natural discharge is high, supplementary charging occurs so that deterioration of the battery may also be higher.

Aspects of the disclosure are to address at least the above-mentioned problems and/or disadvantages and to provide at least the advantages described below. Accordingly, an aspect of the disclosure is to provide a method of preventing a battery from being deteriorated when the battery is charged so that a battery life is increased, and an electronic device to which the method is applied.

In accordance with an aspect of the disclosure, an electronic device includes a battery, a charging part configured to be connectable to an external charging device to charge the battery, a memory, and a processor operatively connected to the charging part and the memory, where the processor may determine whether the charging part is connected to the external charging device, determine whether the electronic device moves and/or electronic device usage time information of a user, and reduce a voltage at which the battery enters supplementary charging to a second voltage lower than a first voltage which corresponds to a value stored in the memory, based on whether the electronic device moves and/or the electronic device usage time information.

In accordance with another aspect of the disclosure, a wearable electronic device includes a battery, a charging part configured to be connectable to an external charging device to charge the battery, a memory, a wireless communication circuit that establishes wireless communication with an electronic device, and a processor operatively connected to the charging part, the memory and the wireless communication circuit, where the processor may determine whether the charging part is connected to the external charging device, determine whether the wireless communication circuit establishes the wireless communication with the electronic device, determine whether the wearable electronic device is fixed when the wireless communication is released, determine whether usage time information of the wearable electronic device of a user corresponds to a second time range other than a first time range in which the user is using or is expected to use the wearable electronic device when the wearable electronic device is fixed, and reduce a voltage at which the battery enters supplementary charging to a second voltage lower than a first voltage which corresponds to a value stored in the memory when the usage time information of the wearable electronic device is within the second time range.

In accordance with still another aspect of the disclosure, a method of preventing a battery from deteriorating as a wearable electronic device is charged, the wearable electronic device including a battery, a charging part connected to an external charging device to charge the battery, a memory, a wireless communication circuit that establishes wireless communication with an electronic device, and a processor operatively connected to the charging part, the memory and the wireless communication circuit is disclosed. The method includes determining, by the processor, whether the charging part is connected to the external charging device, determining, by the processor, whether the wireless communication circuit establishes the wireless communication with the electronic device, determining, by the processor, whether the wearable electronic device is fixed when the wireless communication is released, determining whether usage time information of the wearable electronic device of a user corresponds to a second time range other than a first time range in which the user is using or is expected to use the wearable electronic device when the wearable electronic device is fixed, and reducing a voltage at which the battery enters supplementary charging to a second voltage lower than a first voltage which corresponds to a value stored in the memory when the usage time information of the wearable electronic device is within the second time range.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With regard to description of drawings, similar elements may be marked by similar reference numerals.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
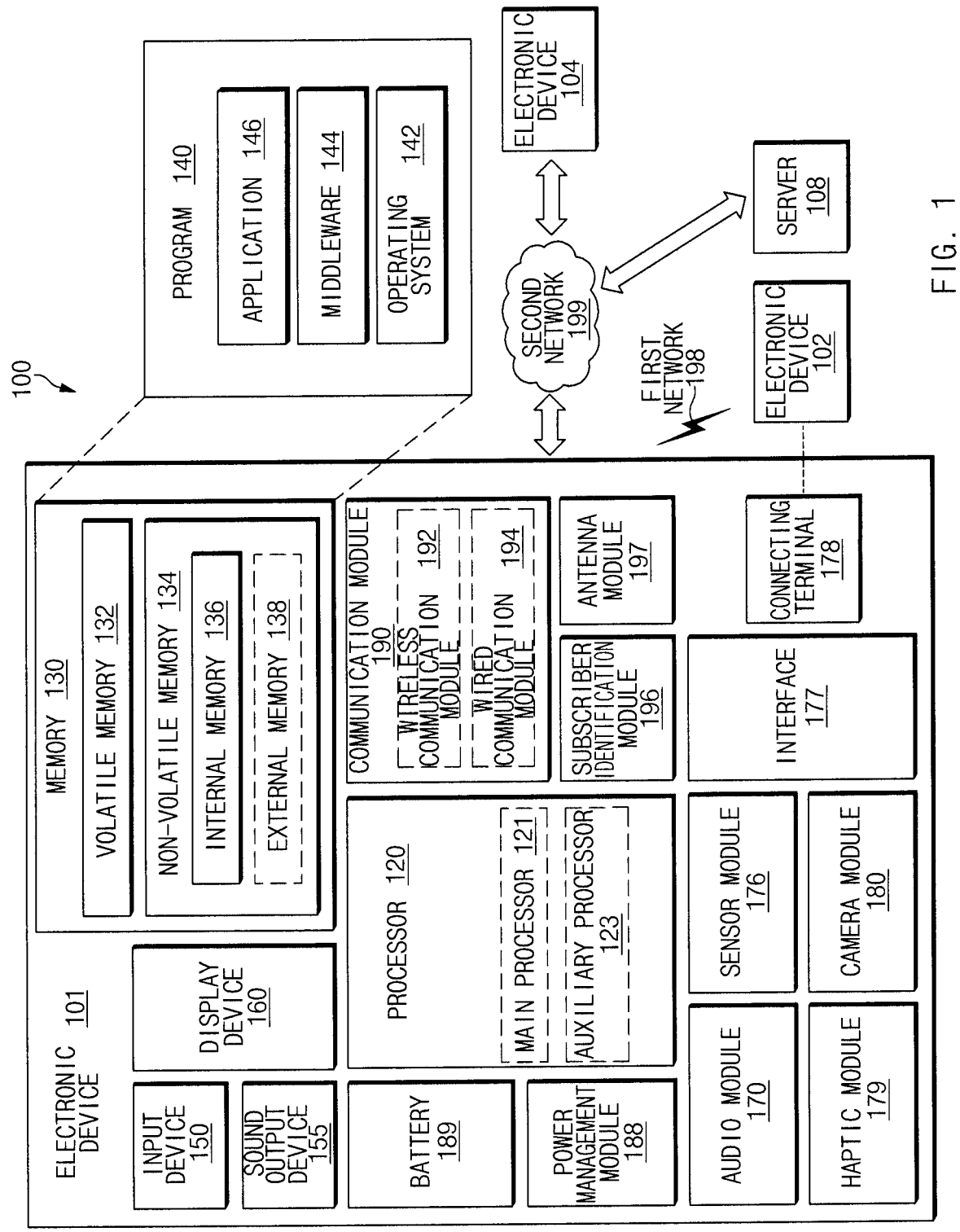
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
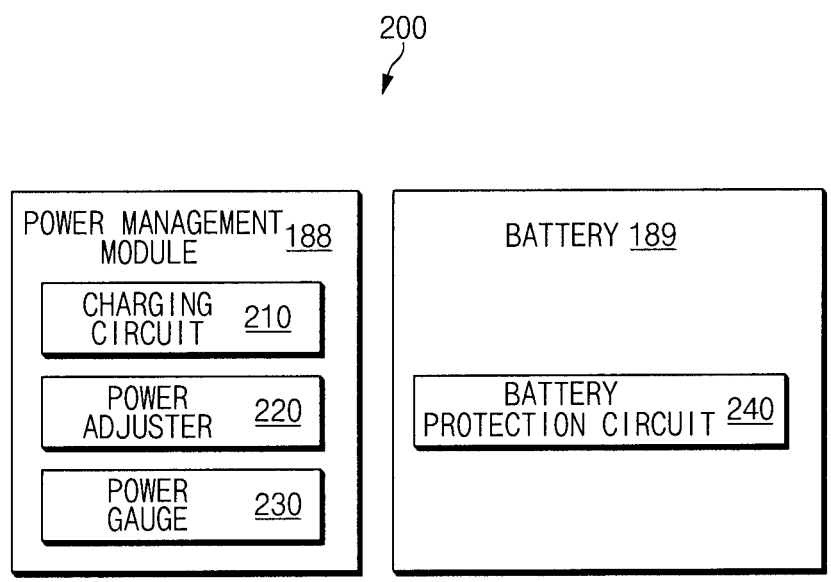
FIG. 2 is a block diagram illustrating the power management module and the battery according to various embodiments.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101.

According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
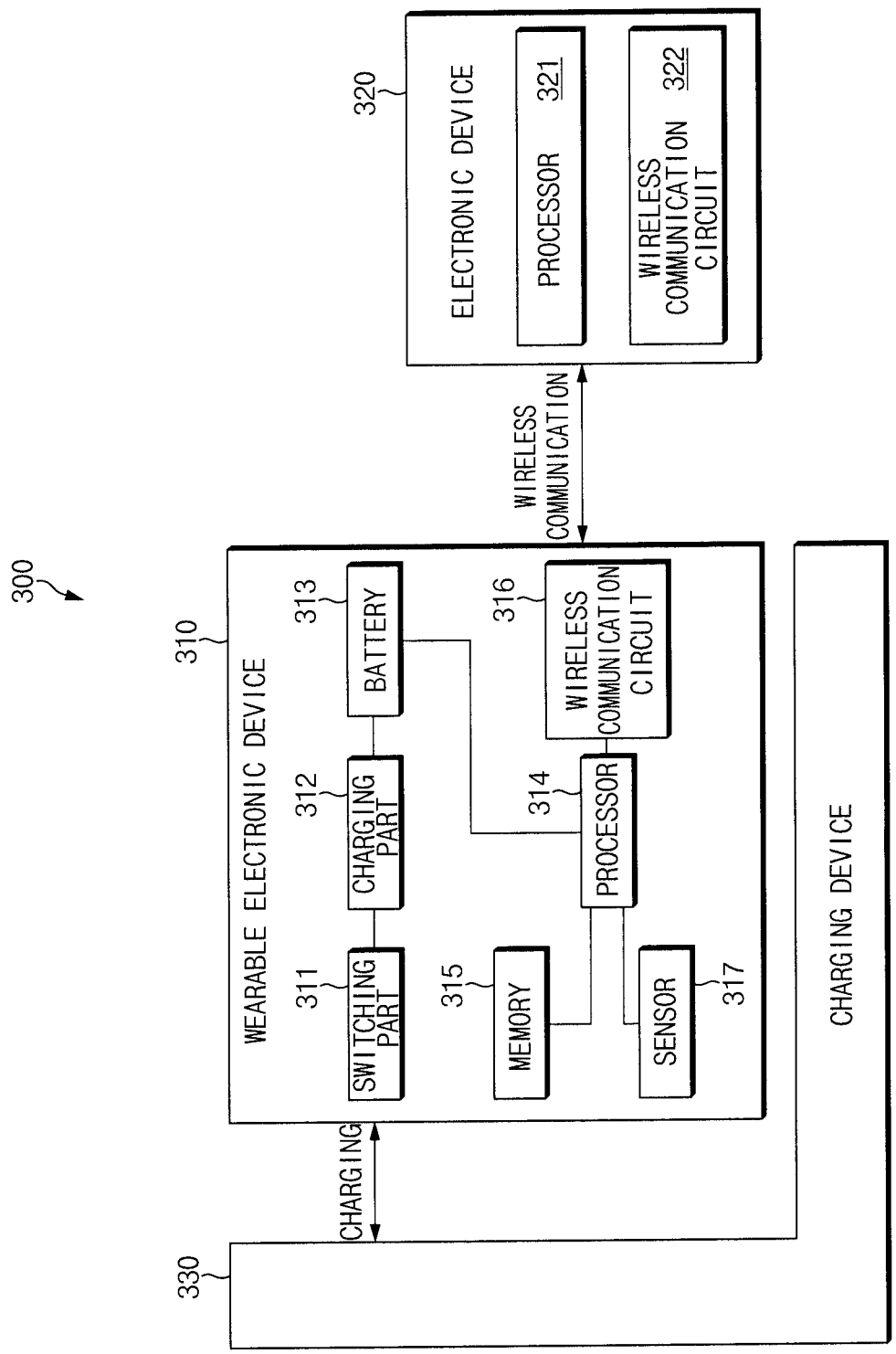
FIG. 3 is a block diagram illustrating a wearable electronic device, an electronic device, and a charging device according to an embodiment.

FIG. 3 is a diagram 300 illustrating a wearable electronic device 310, an electronic device 320, and a charging device 330 according to an embodiment.

In an embodiment, the wearable electronic device 310 may be a portable device worn by a user or is used while being close in proximity to the user. For example, the wearable electronic device 310 may be a device such as a smart watch, a band, a wireless earphone, and/or smart glasses. The wearable electronic device 310 may establish wireless communication with the electronic device 320 to transmit and receive various information and/or signals. The wearable electronic device 310 may be connected to the charging device 330 and be charged. The wearable electronic device 310 may include a switching part 311, a charging part 312, a battery 313, a processor 314, a memory 315, a wireless communication circuit 316, and/or a sensor 317.

In an embodiment, the switching part 311 may transfer a charging current and/or a charging voltage supplied from the charging device 330 to the charging part 312. The switching part 311 may receive a control signal from the processor 314 and control the charging current and/or charging voltage transferred to the charging part 312. For example, the switching part 311 may be closed to supply the charging current to the charging part 312 when the charging part 312 and the battery 313 has voltages that are equal to or less than a specified voltage. As another example, when the battery 313 is fully charged or the charging part 312 and/or the battery 313 show deterioration, the switching part 311 may be opened, thereby blocking the charging current and/or the charging voltage. The switching part 311 may include a current limiting circuit that in turn includes active circuit elements such as MOSFET, BJT, and IGBT.

In an embodiment, the charging part 312 may receive the charging current and/or charging voltage from the switching part 311. The charging part 312 may transmit the charging current and/or charging voltage to the battery 313. The charging part 312 may control the charging current and/or charging voltage transmitted to the battery 313. For example, the charging part 312 may control the intensity of the charging current supplied to the battery 313 to be lower or equal to a rated current. As another example, when the battery 313 is fully charged, the charging part 312 may cut off the charging voltage when the voltage of the battery 313 is equal to or greater than a first voltage, where the first voltage is a voltage value specified to be the voltage of the battery 313 when it is fully charged. The charging part 312 may also perform supplementary charging when the voltage of the battery 313 is equal to or lower than the first voltage.

In an embodiment, the battery 313 may store power required for the wearable electronic device 310 to operate while the user wears or carries the wearable electronic device 310. The battery 313 may be charged by receiving charging current and/or charging voltage supplied from the charging device 330. The battery 313 may supply charged power to circuits and/or devices within the wearable electronic device 310. The battery 313 may be a secondary rechargeable battery. For example, the battery 313 may be a lithium-ion battery or a nickel-cadmium battery.

In an embodiment, the processor 314 may be operably connected to the battery 313, the memory 315, the wireless communication circuit 316, and the sensor 317. The processor 314 may transmit and receive information regarding the state of charge of the battery 313 to the battery 313. The processor 314 may be an AP that is substantially the same as the processor 120 of FIG. 1. The processor 314 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In an embodiment, the memory 315 may store information related to the state of charge of the battery 313. For example, the memory 315 may store information related to the rated charging current and/or rated charging voltage of the battery 313. As another example, the memory 315 may store the first voltage, which again is a voltage level at which the battery 313 may enter supplementary charging. In detail, in one example, when the wearable electronic device 310 is manufactured, the fully charged voltage, which is the voltage at which the battery 313 is fully charged, may be set to about 4.35V, and the first voltage at which the battery 313 enters the supplementary charging may be set to about 4.28V. The fully charged voltage and the first voltage may be stored in the memory 315. The memory 315 may be substantially the same as the memory 130 of FIG. 1.

In an embodiment, the wireless communication circuit 316 may establish a wireless communication connection with the electronic device 320 to transmit and receive information to and from the electronic device 320. For example, the wireless communication circuit 316 may be connected to the electronic device 320 through a Bluetooth™ wireless communication connection. However, the embodiment here is not so limited, and the wireless communication circuit 316 establishes wireless communication using various wireless connection methods such as infrared (IR) communication, Wi-Fi communication, near field communication (NFC), and/or 5G communication.

In an embodiment, the sensor 317 may detect whether the wearable electronic device 310 moves and/or detect an input of the user. The sensor 317 may include at least one sensor and/or type or more. For example, the sensor 317 includes an acceleration sensor, a gyro sensor, a geomagnetic sensor, and/or a 9-axis sensor including an acceleration sensor, a gyro sensor, and a geomagnetic sensor to detect whether the wearable electronic device 310 moves, and a touch sensor that can detect a user's touch.

In an embodiment, the electronic device 320 may be a device connected to the wearable electronic device 310. For example, the electronic device 320 may be a device such as a smart phone, a tablet PC, and/or an Internet of things (IoT) parent terminal. The electronic device 320 may establish wireless communication with the wearable electronic device 310 to transmit and receive various information and/or signals. The electronic device 320 may include a processor 321 for control and a wireless communication circuit 322 that establishes wireless communication with the wearable electronic device 310.

In an embodiment, the charging device 330 may be connected to the wearable electronic device 310. The charging device 330 may charge the wearable electronic device 310. For example, the charging device 330 may be a dock capable of wirelessly charging the wearable electronic device 310 when the wearable electronic device 310 is disposed at a specified location on the charging device 330. As another example, the charging device 330 may be an adapter connected to the wearable electronic device 310 through a wire such as a cable to charge the wearable electronic device 310.

Figure 4:
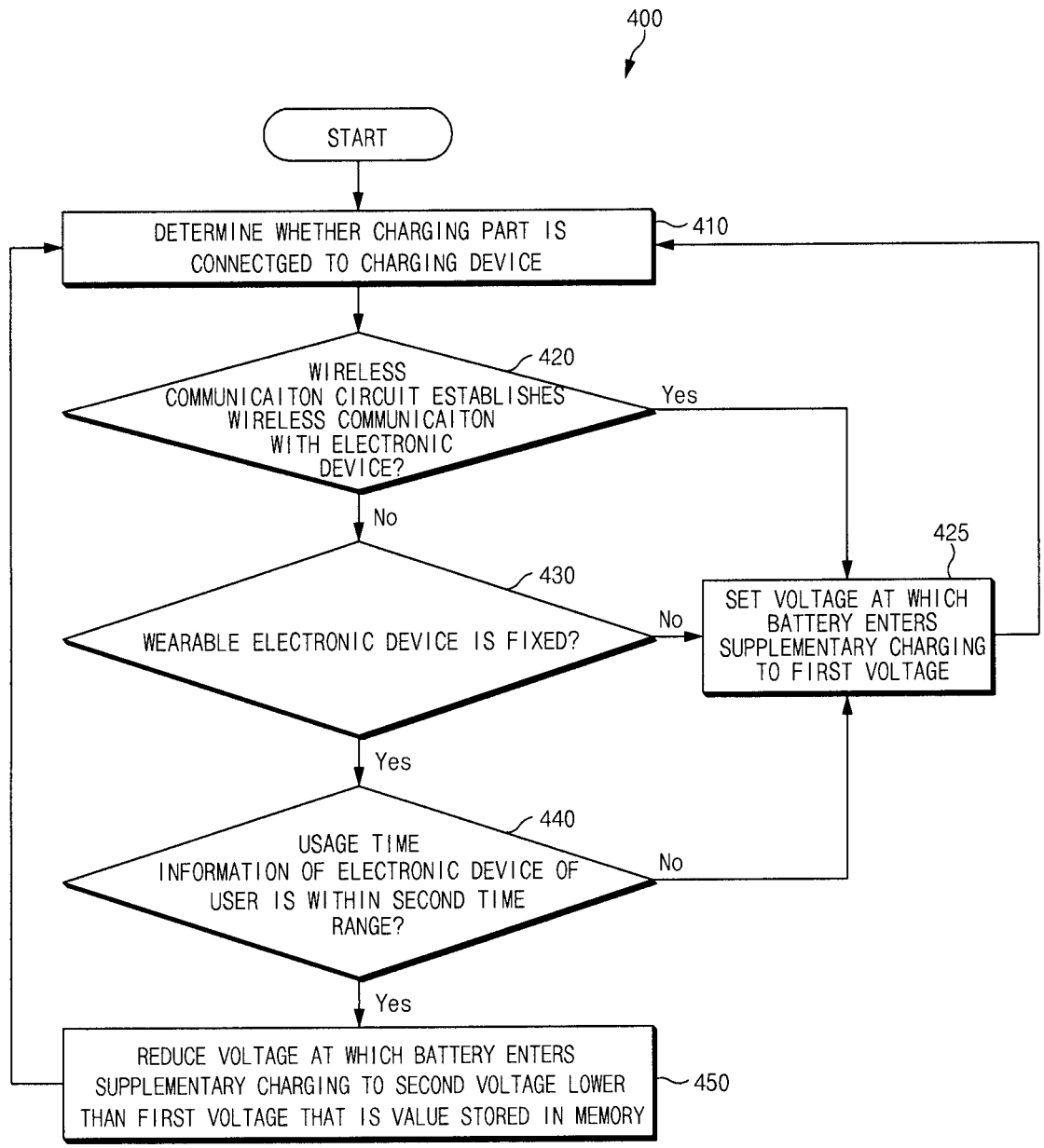
FIG. 4 is a flowchart illustrating a method of preventing a battery from deteriorating due to charging of a wearable electronic device according to an embodiment.

FIG. 4 is a flowchart 400 illustrating a method of preventing the battery 313 from being deteriorated due to charging of the wearable electronic device 310 according to an embodiment.

In operation 410, the processor 314 of the wearable electronic device 310 according to an embodiment may determine whether the charging part 312 is connected to the charging device 330. The processor 314 may determine whether the charging part 312 receives the charging current and/or charging voltage from the charging device 330. For example, when current flows into the charging part 312 and/or the battery 313 or the voltage level of the charging part 312 and/or the battery 313 increases, the processor 314 may determine that the charging part 312 is receiving charging current and/or charging voltage from the charging device 330. As another example, when a control signal is provided to close the switching part 311, the processor 314 may determine that the charging part 312 is receiving charging current and/or charging voltage from the charging device 330. When it is determined that the charging part 312 is connected to the charging device 330, the processor 314 may determine that the battery 313 is in a charging state and may proceed to operation 420.

The processor 314 of the wearable electronic device 310 according to an embodiment may determine whether the wireless communication circuit 316 establishes wireless communication with the electronic device 320 in operation 420. When the user uses the wearable electronic device 310 and the electronic device 320, the wearable electronic device 310 and the electronic device 320 may be connected through wireless communication to transmit and receive various information such as biometric information and notification information. For example, the wearable electronic device 310 and the electronic device 320 may be connected through a Bluetooth communication connection.

In an embodiment, the processor 314 may determine whether wireless communication is established by determining whether a data packet is transmitted or received between the wearable electronic device 310 and the electronic device 320. In detail, the processor 314 may determine whether the electronic device 320 transmits a response signal corresponding to a specified test signal after instructing to transmit the specified test signal through the wireless communication circuit 316. When the wireless communication circuit 316 receives the test signal, the processor 314 may determine that the wireless communication circuit 316 and the electronic device 320 has established a wireless communication. When the wireless communication circuit 316 does not receive the test signal, the processor 314 may determine that the wireless communication between the wireless communication circuit 316 and the electronic device 320 is released.

In an embodiment, when the wireless communication circuit 316 establishes wireless communication with the electronic device 320 (operation 420—Yes), the processor 314 may proceed to operation 425. When the wireless communication between the wireless communication circuit 316 and the electronic device 320 is released (operation 420—No), the processor 314 may proceed to operation 430.

In operation 425, the processor 314 of the wearable electronic device 310 according to an embodiment may set the voltage at which the battery 313 enters the supplementary charging to the first voltage. When the wireless communication circuit 316 establishes wireless communication with the electronic device 320, the processor 314 may determine that the user is using the wearable electronic device 310. Alternatively, when the wireless communication circuit 316 establishes wireless communication with the electronic device 320, the processor 314 may assume that the user can identify the charging state of the wearable electronic device 310.

In an embodiment, the processor 314 is configured to perform the supplementary charging when the voltage of the battery 313 is smaller than the first voltage set in the memory 315 in a state in which the user is using the wearable electronic device 310 and/or in a state in which the user can identify the charging state of the wearable electronic device 310. This way, supplementary charging is performed in a specified condition, such as the state in which the user is using the wearable electronic device 310 and/or the state in which the user can identify the charging state of the wearable electronic device 310. In doing so, it is possible to maintain the battery 313 to be fully charged after being charged while the wearable electronic device 310 is connected to the charging device 330. Thus, effects of natural discharge of the battery 313 after being fully charged is negated.

In operation 430, the processor 314 of the wearable electronic device 310 according to an embodiment may determine whether the wearable electronic device 310 is fixed. In operation 440, the processor 314 of the wearable electronic device 310 according to an embodiment may identify information about the time the user last used the electronic device. When the wireless communication between the wireless communication circuit 316 and the electronic device 320 is released, the user may be only carrying the electronic device 320 and not the wearable electronic device 310, so that it is impossible for the processor 321 to identify whether the wearable electronic device 310 is connected to the charging device 330. Alternatively, when the wireless communication between the wireless communication circuit 316 and the electronic device 320 is released, the processor 314 may determine that the user cannot identify or use the wearable electronic device 310. In these cases, the processor 314 may first determine whether the wearable electronic device 310 moves and/or the user's electronic device usage time information.

In an embodiment, the processor 314 may determine that the wearable electronic device 310 is fixed when the sensor 317 detects that the location of the wearable electronic device 310 is fixed. For example, when the location of the wearable electronic device 310 detected by the acceleration sensor, the gyro sensor, the geomagnetic sensor, and/or the 9-axis sensor including the acceleration sensor, the gyro sensor and the geomagnetic sensor maintains constant coordinates for a specified time period, the processor 314 may recognize that the location of the wearable electronic device 310 is fixed and determine that the wearable electronic device 310 is fixed.

In an embodiment, the processor 314 may determine that the wearable electronic device 310 is fixed when a user input to the wearable electronic device 310 is not performed for a specified time period or more. For example, when touch events are not generated by the user for a specified time period, the processor 314 may recognize that the user is not using or viewing the wearable electronic device 310 and may determine that the wearable electronic device 310 is fixed.

In an embodiment, the processor 314 may proceed to operation 440 when it is identified that the wearable electronic device 310 is fixed (operation 430—Yes). When it is identified that the wearable electronic device 310 moves (operation 430—No), the processor 314 may proceed to operation 425 to set the first voltage, that is, the voltage at which the battery 313 enters the supplementary charging.

The processor 314 of the wearable electronic device 310 according to an embodiment may determine whether the user's electronic device usage time information is within a second time range in operation 440.

In an embodiment, the processor 314 may identify that the user's electronic device usage time information is within the second time range when the user's electronic device usage time information is in a time range other than the first time range. The first time range may be a time range in which the user is using or is expected to use the wearable electronic device 310. For example, the processor 314 may directly receive information about a sleep time period (e.g., 11 pm to 7 am) that is set to correspond to when the user is asleep by the user, or may be set by analyzing the user's usage pattern. The processor 314 may set an activity time period (e.g., 7 am to 11 pm), in which the user is active, as the first time range. Again, the first time range may be when the user uses or is expected to use the wearable electronic device 310. Accordingly, the sleep time period may be the second time range.

In an embodiment, the processor 314 may set a time period (e.g., 5 am to 11 pm) that is a combination of the user's active time period and part of the sleep time period before the user is awake as the first time range and may set the remaining hours in the day (e.g., 11 pm to 5 am) as the second time range. Accordingly, the processor 314 may set the second time range such that the user is not active while the second time range transitions to the first time range.

In an embodiment, the processor 314 may proceed to operation 425 when the user's electronic device usage time information is within the first time range (operation 440—NO). The processor 314 may proceed to operation 450 when the user's electronic device usage time information is within the second time range (operation 440—YES).

The processor 314 of the wearable electronic device 310 according to an embodiment of the disclosure, in operation 450, may reduce the voltage at which the battery 313 enters the supplementary charging to the second voltage lower than the first voltage, where the second voltage and/or the first voltage is a value stored in the memory 315. In the state where the wearable electronic device 310 is fixed, the processor 314 determines that the wearable electronic device 310 is not used and/or recognized by the user when the wearable electronic device 310 is within the second time range. The processor 314 may greatly reduce the voltage level for entering the supplementary charging such that the number of times the battery 313 enters supplementary charging may be reduced. For example, the processor 314 may reduce the voltage for entering the supplementary charging from about 4.28V, which is the first voltage, to about 3.80V, which is the second voltage.

In an embodiment, while the wearable electronic device 310 is connected to the charging device 330, the number of times the voltage of the battery 313 is reduced to the second voltage or less due to natural discharge of the wearable electronic device 310 may be lower than the number of times the voltage of the battery 313 is reduced to the first voltage or below. Accordingly, the number of times the wearable electronic device 310 performs the supplementary charging may be reduced such that it is possible to prevent the battery 313 from deteriorating and increase the life of the battery 313.

In an embodiment, when the wearable electronic device 310 moves and/or is the first time range, the processor 314 may be configured to restore the voltage at which the battery 313 enters the supplementary charging to the first voltage. When it is recognized that the user is using the wearable electronic device 310, the processor 314 may restore the voltage entering the supplementary charging to the first voltage such that the battery 313 performs the supplementary charging as it is originally designed. Accordingly, when the user uses the wearable electronic device 310, the processor 314 may control the supplementary charging such that it appears to the user that the battery 313 is always fully charged.

In an embodiment, when the sensor 317 detects that the location of the wearable electronic device 310 is changing and/or detects a user's input, the processor 314 may be configured to restore the voltage at which the battery 313 enters the supplementary charging to the first voltage. For example, when the acceleration sensor and/or the 9-axis sensor detects that the wearable electronic device 310 is moving, the processor 314 may recognize that the user moves while wearing or carrying the wearable electronic device 310 and may be configured to restore the voltage at which the battery 313 enters the supplementary charging to the first voltage. As another example, when the touch sensor detects a user's touch event in the wearable electronic device 310, the processor 314 may recognize that the user performs an input to the wearable electronic device 310 or is using the wearable electronic device 310 and may be configured to restore the voltage at which the battery 313 enters the supplementary charging to the first voltage.

In an embodiment, when the user's electronic device usage time information is within the time range in which the user uses or is expected to use the wearable electronic device 310, the processor 314 may be configured to restore the voltage at which the battery 313 enters the supplementary charging to the first voltage. For example, the processor 314 may directly receive information about a sleep time period (e.g., 11 pm to 7 am) from the user, or may set the sleep time period by analyzing the user's usage pattern. In this case, the processor 314 may set an activity time period (e.g., 7 am to 11 pm) as the first time range which is a time range in which the user uses or is expected to use the wearable electronic device 310. The processor 314 may be configured to restore the voltage at which the battery 313 enters the supplementary charging to the first voltage during the activity time period.

In an embodiment, the processor 314 may perform additional operations to prevent deterioration of the battery 313 when the wearable electronic device 310 is within the second time range while being in the fixed state. For example, when the wearable electronic device 310 is within the second time range in the fixed state, the processor 314 may switch the wearable electronic device 310 to a standby state. In the standby state, the functions and operations of the wearable electronic device 310 may be stopped to be substantially the same as when the wearable electronic device 310 is powered off, with the main exception being the random access memory (RAM) of the wearable electronic device 310 may still be powered during the standby state. Thus, the standby state may be defined as a state where the wearable electronic device 310 is activated faster than when the wearable electronic device 310 is powered off. The wearable electronic device 310 may exit the standby state by a user input. In the standby state, the degree at which the wearable electronic device 310 naturally discharges may be reduced as compared to the normal state. Accordingly, when the wearable electronic device 310 is switched to the standby state, the number of times the battery 313 enters the supplementary charging may be further reduced. As another example, when the wearable electronic device 310 meets an inactive condition, for example, when the wearable electronic device 310 is not being used, the processor 314 may be configured to block the charging current flowing from the charging part 312 to the battery 313. The processor 314 may block the charging current while the user cannot visually recognize the wearable electronic device 310, thereby preventing the battery 313 from deteriorating and increasing the life of the battery 313, so that the battery 313 is more reliable.

In an embodiment, the processor 314 may determine whether a specified time period has elapsed since first entering the second time range in the fixed state, and may be configured to reduce the voltage at which the battery 313 enters the supplementary charging from the first voltage to the second voltage when it is within the second time range in the fixed state until after the expiration of the specified time period. If immediately changing the first voltage to the second voltage after the transition to the second time range, the user may be able to recognizing the change in charging mode. To prevent this, the processor 314 may recognize that the user does not use the wearable electronic device 310, periodically monitor whether the wearable electronic device 310 is in the second time range in the fixed state, and perform the operation for preventing the battery 313 from deteriorating after certain period of time has elapsed since the wearable electronic device 310 first enters the second time range in the fixed state.

In an embodiment, to reduce the power consumed when the processor 314 periodically performs the monitoring, when the voltage at which the battery 313 enters the supplementary charging is the first voltage, a second time period for monitoring the wearable electronic device 310 may be set to be the same as or longer than a first time period at which the battery 313 is performing the supplementary charging. In addition the processor 314 may determine whether the wireless communication with the electronic device 320 is established a specified time period after the voltage at which the battery enters the supplementary charging is reduced to the second voltage. If so, the processor 314 may restore the voltage at which the battery enters the supplementary charging to the first voltage.

Figure 5:
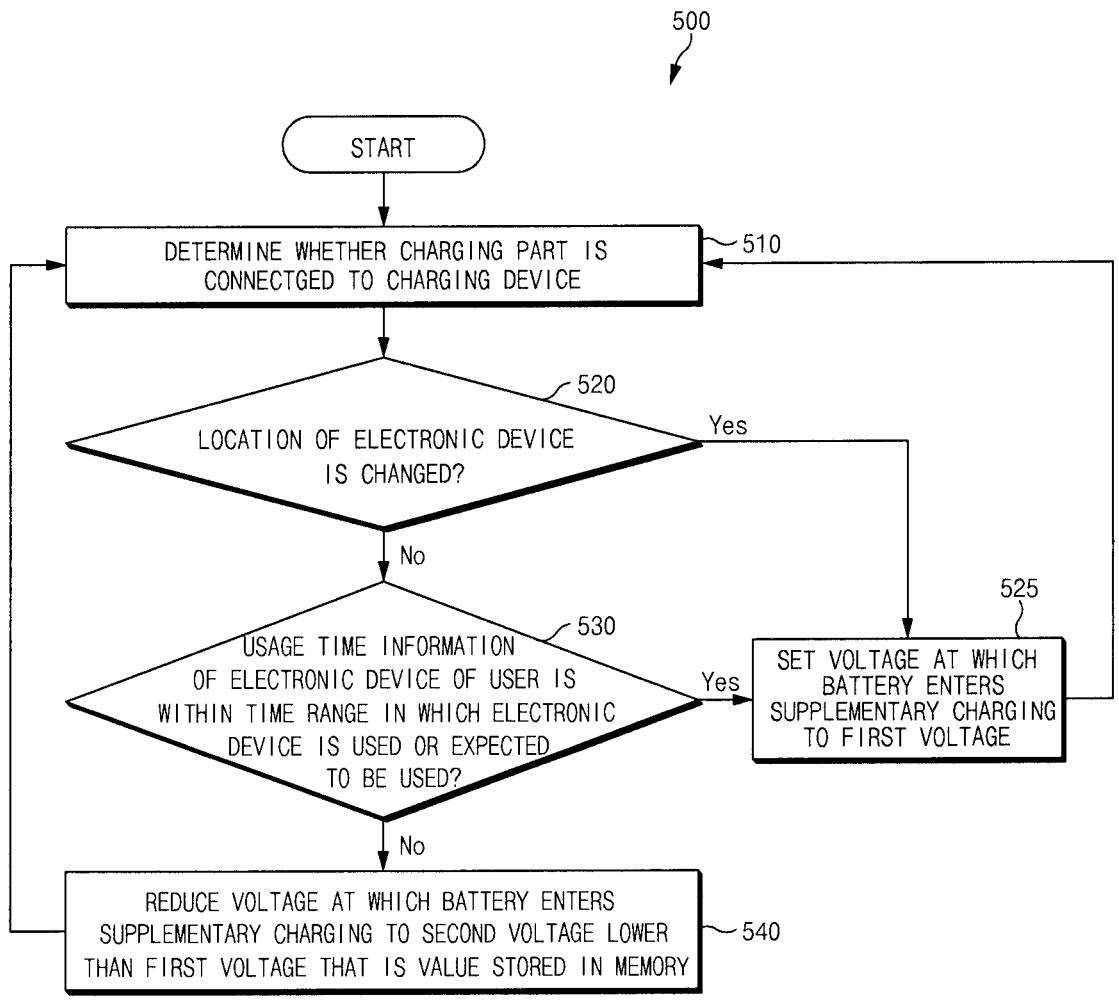
FIG. 5 is a flowchart illustrating a method of preventing a battery from deteriorating due to charging of an electronic device according to an embodiment.

FIG. 5 is a flowchart 500 illustrating a method of preventing a battery (e.g., the battery 189 of FIG. 1) from deteriorating due to charging of an electronic device (e.g., the electronic device 101 of FIG. 1) according to an embodiment. The electronic device 101 may be a mobile electronic device such as a smart phone, an Internet of Things (IoT) electronic device, and/or a robot (e.g., a robot cleaner).

In operation 510, a processor (e.g., the processor 120 of FIG. 1) of the electronic device 101 according to an embodiment may determine whether a charging part (e.g., the charging circuitry 210 of FIG. 2) is connected to a charging device (e.g., the charging device 330 of FIG. 3). The processor 120 may determine whether the charging part 210 receives charging current and/or charging voltage from the charging device 330. For example, when the amount of power measured by a power gauge (e.g., the power gauge 230 of FIG. 2) increases, the processor 120 may determine that the charging part 210 receives the charging current and/or charging voltage from the charging device 330. When it is identified that the charging part 210 is connected to the charging device 330, the processor 120 may determine that the battery 189 is in a charging state and proceed to operation 520.

In operation 520, the processor 120 of the electronic device 101 according to an embodiment may determine whether the location of the electronic device 101 is changed. Unlike the wearable electronic device 310 of FIG. 4, the processor 120 may omit the operation of determining whether the electronic device 101 establishes wireless communication and determine whether the location of the electronic device 101 is changed.

In an embodiment, the electronic device 101 may further include a wireless communication device (e.g., the wireless communication module 194 of FIG. 1) that establishes wireless communication with a server (e.g., the server 108 of FIG. 1) and/or an external electronic device (e.g., the electronic device 102 of FIG. 1). The processor 120 may be configured to allow the wireless communication circuit 194 to detect whether the location of the electronic device 101 is fixed by using wireless communication to determine whether the location of the electronic device 101 is changed. For example, the wireless communication circuit 194 may detect the location of the electronic device 101 by determining a positional relationship through communication with a nearby electronic device (e.g., the electronic device 104 of FIG. 1), such as a home appliance connected through IoT, or receive location coordinates through GPS or Wi-Fi communication with the server 108. Thus, the processor 120 may determine whether the location of the electronic device 101 is changed by using wireless communication with the wireless communication circuit 194.

In an embodiment, the electronic device 101 may further include a sensor (e.g., the sensor module 176 of FIG. 1) for detecting whether the electronic device 101 is moved. The sensor 176 may detect whether the location of the electronic device 101 is fixed and/or changed. For example, when an acceleration sensor, a gyro sensor, a geomagnetic sensor, and/or a 9-axis sensor including an acceleration sensor, a gyro sensor, and a geomagnetic sensor, which are included in the sensor 176, detects that the location of the electronic device 101 is fixed, the processor 120 may determine that the location of the electronic device 101 is fixed.

In an embodiment, the processor 120 may proceed to operation 525 when it is determined that the location of the electronic device 101 is changed (operation 520—YES). When it is determined that the location of the electronic device 101 is fixed (operation 520—NO), the processor 120 may proceed to operation 530.

In operation 525, the processor 120 of the electronic device 101 according to an embodiment may set a voltage at which the battery 189 enters the supplementary charging to the first voltage. When the location of the electronic device 101 is changed, the processor 120 may determine that the user is using the electronic device 101. Alternatively, when the location of the electronic device 101 is changed, the processor 120 may determine that the user can identify the charging state of the electronic device 101.

In operation 530, the processor 120 of the electronic device 101 according to an embodiment may determine whether the user's electronic device usage time information is within a time range in which the electronic device 101 is used or expected to be used. The processor 120 may receive current time information, and may determine whether the received current time information is within a first time range in which the user uses or is expected to use the electronic device 101, or a second time range which is a time range other than the first time range.

In an embodiment, when the user's electronic device usage time information is within the first time range in which a user uses or is expected to use the electronic device 101 (operation 530—YES), the processor 120 may proceed to operation 525. The processor 120 may proceed to operation 540 when the user's electronic device usage time information is within the second time range that is a time range other than the first time range (operation 530—NO).

In operation 540, the processor 120 of the electronic device 101 according to an embodiment may reduce the voltage at which the battery 189 enters the supplementary charging to a second voltage lower than a first voltage, where the second voltage and/or the first voltage is a value stored in the memory 130. When the electronic device 101 satisfies the inactive condition when the time information is within the second time range, the processor 120 may identify that the user does not use or cannot visually identify the electronic device 101, and reduce the voltage level entering the supplementary charging, thereby reducing the number of times the battery 189 enters the supplementary charging.

When the location of the electronic device 101 is fixed while the charging part 210 is connected to the charging device 330 and the user's electronic device usage time information is within the second time range, the processor 120 may apply control schemes according to one or more embodiments in order to reduce the number of times the battery enters the supplementary charging.

For example, the processor 120 may turn off the power of the electronic device 101. The processor 120 may detect whether a state in which the user does not use the electronic device 101 is maintained until a specified time period elapses. When the specified time period elapses, the processor 120 may block charging of the electronic device 101 and turn off the power of the electronic device 101.

As another example, the processor 120 may allow the electronic device 101 to enter a power saving mode. The processor 120 may allow the electronic device 101 to change into a deep sleep state, thereby allowing the electronic device 101 to enter the power saving mode. The processor 120 may enter the power saving mode when the state in which the user does not use the electronic device 101 is maintained for a specified time period.

As still another example, the processor 120 may set an unused time period for which the electronic device 101 is not used. The processor 120 may set the second time range, which is a time range excluding the time range in which the electronic device 101 is used or is expected to be used, as the unused time period. For example, the processor 120 may set the user's bedtime as the unused time period. The processor 120 may be configured to prevent the electronic device 101 from being charged during an unused time period. As the user would want to use the electronic device 101 after the unused time period elapses, in order to prevent the problem of not fully charging the electronic device 101 prior to use, the processor 120 is configured to allow the electronic device 101 to perform the supplementary charging before a specified time period ahead of expiration of the unused time period.

Figure 6:
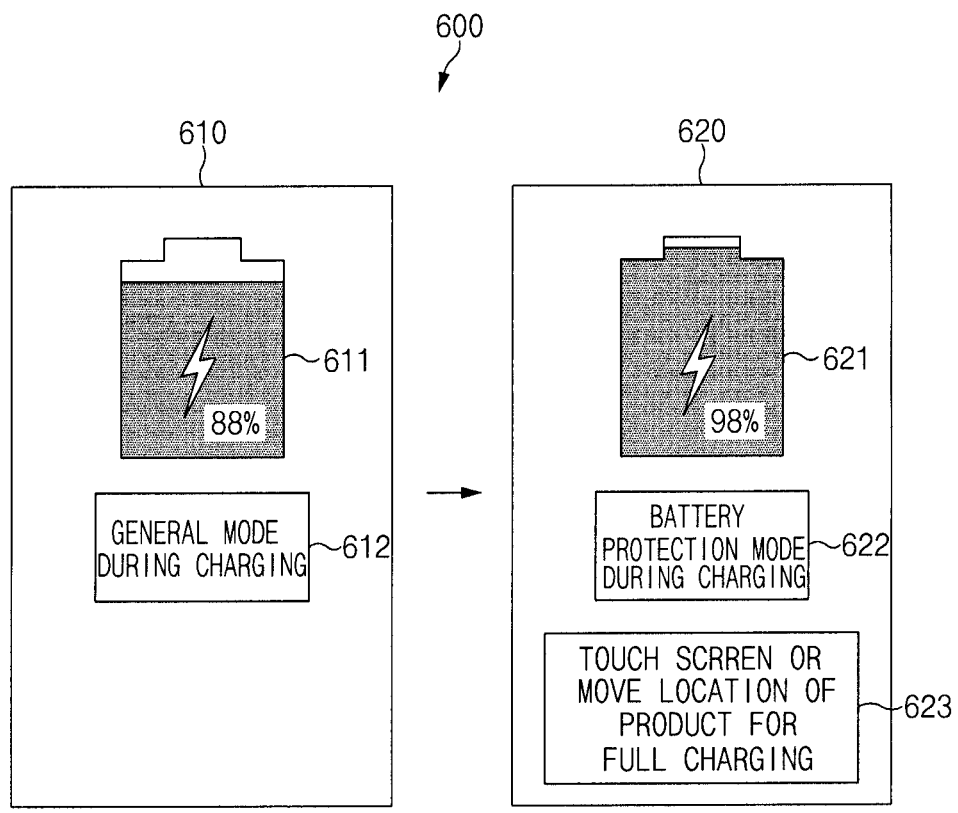
FIG. 6 is a view illustrating information displayed on a display when changing from an active condition to an inactive condition during charging of an electronic device according to an embodiment.

FIG. 6 is a view 600 illustrating information displayed on a display (e.g., the display 160 of FIG. 1) when changing from an active condition to an inactive condition during charging of an electronic device (e.g., the electronic device 101 of FIG. 1) according to an embodiment.

In an embodiment, the display 160 for displaying charging information of charging a battery (e.g., the battery 189 of FIG. 1) may be further included. The processor (e.g., the processor 120 of FIG. 1) may be configured to display, on the display 160, guide information indicating entrance into a mode of protecting the battery 189 when the inactive condition is met.

In an embodiment, the display 160 may display a first screen 610 indicating that the electronic device 101 is being charged in a normal mode. The first screen 610 may include a first UI 611 indicating a current degree of battery charging and a first message window 612 indicating a charging state and a charging mode. When the inactive condition is met, the processor 120 may switch the screen displayed by the display 160 from the first screen 610 to a second screen 620. However, the disclosure is not so limited, and for example when the user touches the first message window 612, a selection window for switching between the normal mode or the battery protection mode may be displayed. The battery protection mode is a mode in which the voltage level at which the battery 189 enters the supplementary charging to prevent deterioration of the battery 189 is reduced. The screen displayed by the display 160 may be switched from the first screen 610 to the second screen 620 by user input.

In an embodiment, the display 160 may display the second screen 620 indicating that the electronic device 101 is being charged in the battery protection mode. The second screen 620 may include a second UI 621 indicating the current degree of battery charging and a second message window 622 indicating the charging state and the charging mode. In addition, the second screen 620 may further include a guide message window 623 for allowing the user to switch full charging, in which the voltage for supplementary charging is switched from the second voltage in the battery protection mode to the first voltage in the normal mode. For example, the second screen 620 may display a message "Touch screen or move location of product for full charging" in the guide message window 623. When selected, the electronic device 101 returns to the normal mode and can be fully charged when the user is to use the electronic device 101.

Figure 7:
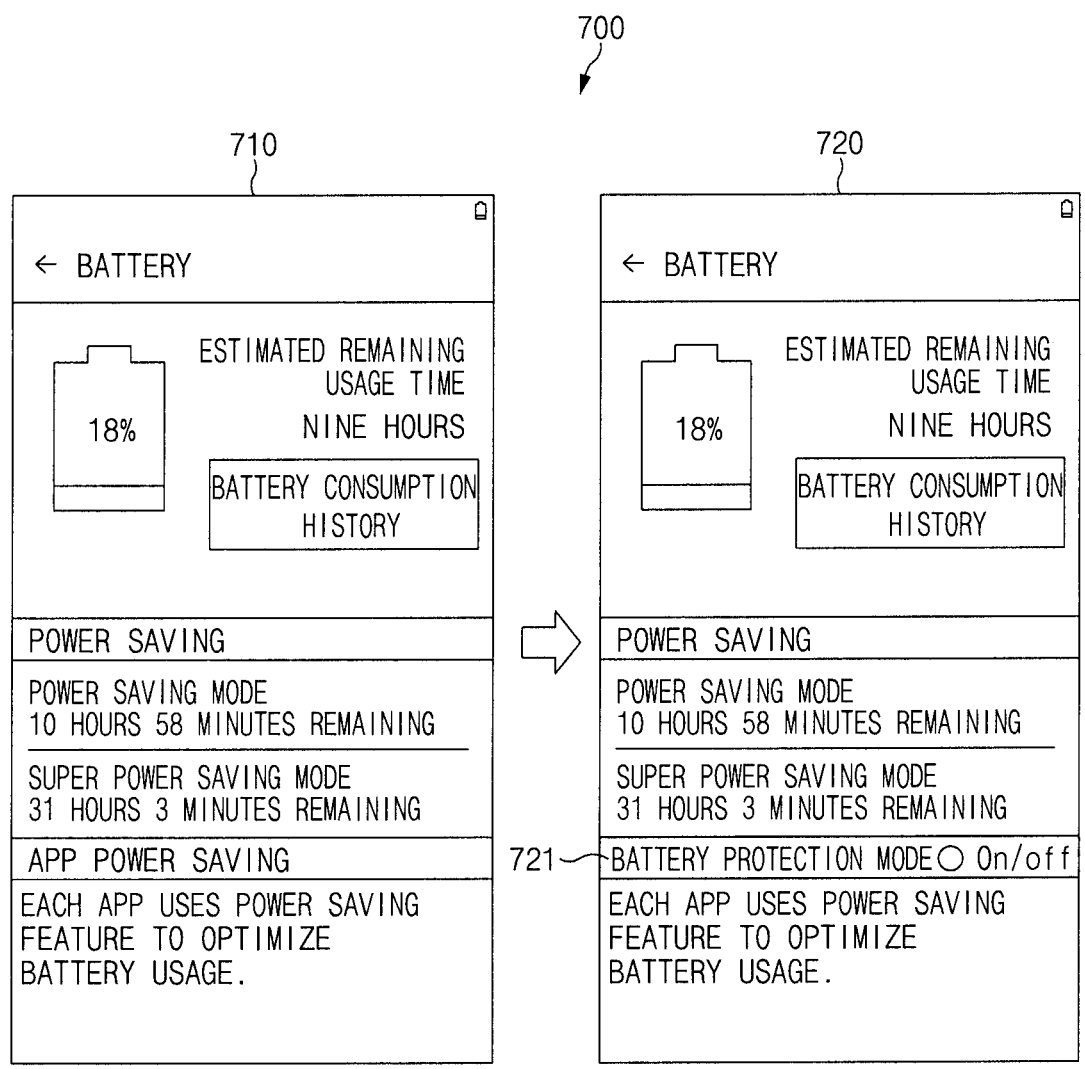
FIG. 7 is a view illustrating a screen for setting a battery protection mode of an electronic device according to an embodiment.

FIG. 7 is a view 700 illustrating a screen for setting a battery (e.g., the battery 189 of FIG. 1) protection mode of an electronic device (e.g., the electronic device 101 of FIG. 1) according to an embodiment.

In an embodiment, the electronic device 101 may display the information related to the battery 189 and a setting screen 710 for setting the battery usage state through a display (e.g., the display device 160 of FIG. 1). The setting screen 710 may include information related to the battery 189. For example, the setting screen 710 may include a picture and/or a percentile showing the current residual battery level. The setting screen 710 may also display the estimated remaining usage time of the battery 189. The setting screen 710 may further display a menu button that displays the consumption history of the battery 189.

In an embodiment, the setting screen 710 may include a menu that changes the battery 189 to various power saving modes. For example, the setting screen 710 may include a power saving mode, a super power saving mode, and/or an app power saving menu. The setting screen 710 may display the estimated remaining usage time when changing to the power saving mode and/or the super power saving mode. When the app power saving menu is selected, the setting screen 710 may display contents related to how the battery usage amount is optimized by using the power saving function in each app.

In an embodiment, the electronic device 101 may selectively turn on or off the battery protection mode. The electronic device 101 may display a protection setting screen 720 that turns on or off the battery protection mode on the display 160. The protection setting screen 720 may include a selection window 721 for turning on or off the battery protection mode. When the battery protection mode is turned on, the processor of the electronic device 101 (e.g., the processor 120 of FIG. 1) may perform operation 540. The processor 120 may decrease the number of times that the battery 189 enters the supplementary charging by reducing the voltage entering the supplementary charging to the second voltage that is lower than the first voltage, which is a value stored in the memory 130.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments of the disclosure, when it corresponds to the inactive condition in which a user does not use the electronic device or does not identify whether the battery is fully charged while the electronic device is connected to the charging device, it is possible to reduce the frequency at which the supplementary charging of the battery occurs, so that the battery deterioration may be prevented.

In addition, according to the embodiments of the disclosure, when it corresponds to the active condition in which the user can recognize the electronic device, it is possible to fully charge the battery. In this case, it is possible to allow the user to use the electronic device in the fully charged state while reducing the frequency of the occurrence of the supplementary charging of the battery by performing the supplementary charging of the battery only when it is necessary to fully charge the battery of the electronic device.

In addition, various effects that are directly or indirectly understood through the present disclosure may be provided.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a battery;
a charging part configured to be connectable to an external charging device to charge the battery;
a memory; and
a processor operatively connected to the charging part and the memory, wherein the processor is configured to:
determine whether the charging part is connected to the external charging device,
determine whether the electronic device moves and/or electronic device usage time information, wherein the electronic device usage time information indicates a time range in which a user is active determined based on a usage pattern of the user, and
reduce a voltage at which the battery enters supplementary charging to a second voltage lower than a first voltage which corresponds to a value stored in the memory, based on whether the electronic device moves and/or the electronic device usage time information.

2. The electronic device of claim 1, wherein the processor is further configured to:
restore the voltage at which the battery enters the supplementary charging to the first voltage when the electronic device moves and/or the electronic device usage time information changes.

3. The electronic device of claim 1, further comprising:
a wireless communication circuit configured to establish wireless communication with a server and/or an external electronic device,
wherein the processor is further configured to reduce the voltage at which the battery enters the supplementary charging to the second voltage when the wireless communication circuit uses the wireless communication to detect that a location of the electronic device is fixed.

4. The electronic device of claim 1, further comprising:
at least one sensor configured to detect whether the electronic device moves and/or an input of the user,
wherein the processor is further configured to:
reduce the voltage at which the battery enters the supplementary charging to the second voltage when the at least one sensor detects that a location of the electronic device is fixed.

5. The electronic device of claim 1, wherein the processor is further configured to:
reduce the voltage at which the battery enters the supplementary charging to the second voltage when the electronic device usage time information is in a second time range other than a first time range in which the user is using or is expected to use the electronic device.

6. The electronic device of claim 5, wherein the processor is further configured to:
reduce the voltage at which the battery enters the supplementary charging from the first voltage to the second voltage when the processor determines, based on the electronic device usage time information, that a specified time period has elapsed from a transition from the first time range to the second time range.

7. The electronic device of claim 1, further comprising:
a display configured to display information about battery charging,
wherein the processor is further configured to:
display guide information informing an entry into a battery protection mode when the electronic device usage time information is within a second time range and an inactive condition is met.

8. A wearable electronic device comprising
a battery;
a charging part configured to be connectable to an external charging device to charge the battery;
a memory;
a wireless communication circuit configured to establish wireless communication with an electronic device; and
a processor operatively connected to the charging part, the memory and the wireless communication circuit, wherein the processor is configured to:
determine whether the charging part is connected to the external charging device,
determine whether the wireless communication circuit establishes the wireless communication with the electronic device,
determine whether the wearable electronic device is fixed when the wireless communication is released,
determine whether usage time information of the wearable electronic device of a user corresponds to a second time range other than a first time range in which the user is using or is expected to use the wearable electronic device when the wearable electronic device is fixed, and
reduce a voltage at which the battery enters supplementary charging to a second voltage lower than a first voltage which corresponds to a value stored in the memory when the usage time information of the wearable electronic device is within the second time range.

9. The wearable electronic device of claim 8, wherein the processor is further configured to:
restore the voltage at which the battery enters the supplementary charging to the first voltage when the wearable electronic device is in a moving state or the usage time information of the wearable electronic device is within the first time range.

10. The wearable electronic device of claim 8, further comprising:
at least one sensor configured to detect whether the wearable electronic device moves and/or an input of the user,
wherein the processor is further configured to:
reduce the voltage at which the battery enters the supplementary charging to the second voltage when the at least one sensor detects that a location of the wearable electronic device is fixed and/or a specified time period or more has passed since a last previous input of the user.

11. The wearable electronic device of claim 8, wherein the processor is further configured to:
determine that the usage time information of the wearable electronic device is within the second time range when the usage time information is a sleep time set by the user.

12. The wearable electronic device of claim 8, further comprising:
at least one sensor configured to detect whether the wearable electronic device moves and/or an input of the user,
wherein the processor is further configured to:
restore the voltage at which the battery enters the supplementary charging to the first voltage when the at least one sensor detects that a location of the wearable electronic device is changed and/or detects the input of the user.

13. The wearable electronic device of claim 8, wherein the processor is further configured to:
   switch the wearable electronic device to a standby state or block a charging current flowing from the charging part into the battery when the usage time information of the wearable electronic device is within the second time range.

14. The wearable electronic device of claim 8, wherein the processor is further configured to:
   reduce the voltage at which the battery enters the supplementary charging to the second voltage when the processor determines, based on the usage time information of the wearable electronic device, that a specified time period has elapsed from a transition from the first time range to the second time range.

15. The wearable electronic device of claim 8, further comprising:
   a display configured to display information about battery charging,
   wherein the processor is further configured to:
   display guide information informing an entry into a battery protection mode when the usage time information of the wearable electronic device is within the second time range.

16. A method of preventing a battery from deteriorating as a wearable electronic device is charged, the wearable electronic device including a battery, a charging part configured to be connectable to an external charging device to charge the battery, a memory, a wireless communication circuit configured to establish wireless communication with an electronic device, and a processor operatively connected to the charging part, the memory and the wireless communication circuit, the method comprising:
   determining, by the processor, whether the charging part is connected to the external charging device,
   determining, by the processor, whether the wireless communication circuit establishes the wireless communication with the electronic device,
   determining, by the processor, whether the wearable electronic device is fixed when the wireless communication is released,
   determining whether usage time information of the wearable electronic device of a user corresponds to a second time range other than a first time range in which the user is using or is expected to use the wearable electronic device when the wearable electronic device is fixed, and
   reducing a voltage at which the battery enters supplementary charging to a second voltage lower than a first voltage which corresponds to a value stored in the memory when the usage time information of the wearable electronic device is within the second time range.

17. The method of claim 16, further comprising:
   restoring the voltage at which the battery enters the supplementary charging to the first voltage when the wearable electronic device is in a moving state or the usage time information of the wearable electronic device is within the first time range.

18. The method of claim 16, further comprising:
   determining that usage time information of the wearable electronic device is within the second time range when the usage time information is a sleep time set by the user.

19. The method of claim 16, further comprising:
   determining, by the processor, whether the wireless communication with the electronic device is established a specified time period after the voltage at which the battery enters the supplementary charging is reduced to the second voltage, and
   restoring the voltage at which the battery enters the supplementary charging to the first voltage when the wireless communication with the electronic device is established.

20. The method of claim 16, further comprising:
   restoring, by the processor, the voltage at which the battery enters the supplementary charging to the first voltage when the usage time information of the wearable electronic device is within the first time range.

\* \* \* \* \*